United States Patent
Kim et al.

(10) Patent No.: US 7,471,328 B2
(45) Date of Patent: Dec. 30, 2008

(54) APPARATUS AND METHOD FOR ROTATING IMAGE IN DIGITAL CAMERA

(75) Inventors: Kyoung-shin Kim, Seongnam-si (KR); Myoung-hoon Park, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 587 days.

(21) Appl. No.: 11/077,287

(22) Filed: Mar. 10, 2005

(65) Prior Publication Data

US 2006/0103734 A1    May 18, 2006

(30) Foreign Application Priority Data

Nov. 16, 2004    (KR) ...................... 10-2004-0093589

(51) Int. Cl.
  *H04N 5/235*    (2006.01)
  *H04N 5/76*     (2006.01)
  *H04N 5/222*    (2006.01)

(52) U.S. Cl. ............................. 348/333.12; 348/333.01; 348/333.02; 348/230.1; 348/231.3

(58) Field of Classification Search ............ 348/333.01, 348/333.02, 333.03, 333.06, 333.11, 333.12, 348/207.99, 230.1, 231.3, 231.6
See application file for complete search history.

(56) References Cited

U.S. PATENT DOCUMENTS

| | | | | |
|---|---|---|---|---|
| 5,576,759 | A * | 11/1996 | Kawamura et al. ...... | 348/207.99 |
| 5,661,632 | A * | 8/1997 | Register ................... | 361/683 |
| 5,798,750 | A * | 8/1998 | Ozaki ...................... | 345/656 |
| 6,148,149 | A * | 11/2000 | Kagle ...................... | 396/50 |
| 6,262,769 | B1  | 7/2001  | Anderson et al. | |
| 6,297,795 | B1 * | 10/2001 | Kato et al. ................. | 345/684 |
| 6,473,123 | B1 * | 10/2002 | Anderson ................ | 348/230.1 |
| 6,597,384 | B1 * | 7/2003  | Harrison .................. | 345/204 |
| 6,606,117 | B1 * | 8/2003  | Windle ..................... | 348/239 |
| 6,819,362 | B2 * | 11/2004 | Hsu .......................... | 348/374 |
| 7,002,604 | B1 * | 2/2006  | Barrus et al. ............. | 345/683 |
| 7,019,779 | B1 * | 3/2006  | Suzuki .................. | 348/333.02 |
| 7,054,552 | B2 * | 5/2006  | Konttinen .................. | 396/435 |
| 7,286,178 | B2 * | 10/2007 | Isoyama ................ | 348/333.02 |
| 7,289,102 | B2 * | 10/2007 | Hinckley et al. ........... | 345/156 |
| 2002/0036703 | A1 * | 3/2002 | Hsu .......................... | 348/373 |
| 2002/0191096 | A1 * | 12/2002 | Tanaka et al. .......... | 348/333.06 |
| 2003/0052985 | A1 * | 3/2003 | Oya et al. .............. | 348/333.02 |
| 2004/0095498 | A1 * | 5/2004 | Woodworth ............ | 348/333.01 |

(Continued)

OTHER PUBLICATIONS

Office Action established for CN 200510065679.3 (Feb. 29, 2008).

*Primary Examiner*—Tuan Ho
*Assistant Examiner*—Richard M Bemben
(74) *Attorney, Agent, or Firm*—Drinker Biddle & Reath LLP

(57) ABSTRACT

A camera operating apparatus and method are provided. The apparatus includes a signal processor for rotating and storing a shot image so that a storage direction of the image shot with the camera rotated 90° or 180° may be a reference storage direction. The shot image is stored in such a way that a storage direction of the image shot with the camera rotated may be the reference storage direction, which provides convenience that a user needs not to rotate the camera to check the shot image when playing the image.

17 Claims, 13 Drawing Sheets

(a) SHOOTING    (b) STORAGE STATE

U.S. PATENT DOCUMENTS

| | | | |
|---|---|---|---|
| 2004/0141085 A1* | 7/2004 | Nickel et al. | 348/333.11 |
| 2004/0239792 A1* | 12/2004 | Shibutani et al. | 348/333.12 |
| 2005/0083417 A1* | 4/2005 | Battles et al. | 348/231.6 |
| 2005/0146620 A1* | 7/2005 | Monroe et al. | 348/208.2 |
| 2005/0243196 A1* | 11/2005 | Belz | 348/333.11 |
| 2005/0259173 A1* | 11/2005 | Nakajima et al. | 348/333.12 |
| 2007/0120995 A1* | 5/2007 | Nonaka | 348/333.01 |
| 2008/0036876 A1* | 2/2008 | Kaneda et al. | 348/230.1 |

* cited by examiner (a) SHOOTING    (b) STORAGE STATE (a) SHOOTING          (b) STORAGE STATE (a) SHOOTING  (b) STORAGE STATE

APPARATUS AND METHOD FOR ROTATING IMAGE IN DIGITAL CAMERA

CROSS-REFERENCE TO RELATED PATENT APPLICATIONS

This application claims the priority of Korean Patent Application No. 10-2004-0093589, filed on Nov. 16, 2004, in the Korean Intellectual Property Office, the disclosure of which is incorporated herein in its entirety by reference.

BACKGROUND OF THE INVENTION

1. Field of the Invention

The present invention relates to a camera operating apparatus and method, and more particularly, to an apparatus and a method for rotating and storing a shot image so that a storage direction of an image shot with the camera rotated may be a reference storage direction.

2. Description of the Related Art

As illustrated in FIG. 1, if an image is shot (i.e., captured) with a conventional digital or film camera that is rotated from its normal (e.g., horizontal) orientation as shown in FIG. 1A, the image remains (i.e., is stored) in a shooting direction as shown in FIG. 1B as it was captured. Thus, for proper viewing of the image on a screen, the stored image is rotated manually using a camera menu or rotated on a personal computer (PC) using image manipulation software and stored again afterwards.

FIG. 2 is a flowchart illustrating a convention method for rotating an image stored in a conventional digital camera. An image to rotate is selected (operation 200) and a rotate menu is selected (operation 202). Whether to rotate the selected image is judged (operation 204) and a rotational direction is set (operation 206). If the rotational direction is set, the selected image is rotated (operation 208) and the rotated image is stored (operation 210).

In other conventional digital cameras a gravity sensor is mounted to or included in the camera so that a rotational direction of the camera may be recognized instantly and the image may be automatically stored appropriately for the rotational direction.

If a camera is rotated to perform a shooting, namely, the shooting is performed with the camera rotated in a longitudinal direction or upside down, the shot images are stored in a direction different from a direction of an original object. So, in case of playing the shot images, a user should rotate the camera to check the images. To improve such inconvenience, a menu for rotating an image in a playing mode is provided. However, since an image should be rotated one by one, there is inconvenience that a user should manipulate the menu upon rotation case by case. In the meantime, in case of recognizing a rotational direction of a camera using a gravity sensor to automatically rotate and store a shot image, a manufacturing cost is increased and a small-sizing of a camera is difficult.

SUMMARY OF THE INVENTION

The present invention provides an image rotating apparatus and method for rotating and storing a shot image so that a storage direction of an image shot with a camera rotated may be a reference storage direction.

An apparatus for rotating an image may include a signal processor for rotating and storing a shot image so that a storage direction of an image shot with a camera rotated (90° or 180°) may be a reference storage direction.

The reference storage direction is a direction for storing a shot image without rotating the camera.

According to an aspect of the present invention, there is provided the signal processor, which includes: a symbol generator for generating a predetermined symbol if a rotational shooting of the camera is set; a position setting/storage for storing a reference storage direction and setting and storing a movement position of the symbol so as to indicate a lower end of an image to shoot; a judgment unit for judging rotation of the camera by comparing a storage direction of a shot image with the reference storage direction using the movement of the symbol; and an image processor for controlling to rotate the shot image and store the rotated image so that the storage direction of the shot image may be the reference storage direction.

The position setting/storage may set and store a position of the symbol by pressing up/down/left/right button with a shutter button pressed, or include a button for setting a movement position of the symbol. The position setting/storage may set and store a position of the symbol by changing the number of times the button is inputted, or set and store a position of the symbol by selecting a predetermined menu for setting a position of the symbol.

The image processor may store the rotated image and simultaneously delete the symbol.

According to another aspect of the present invention, there is provided an image rotating method, which includes: (a) displaying a predetermined symbol if a camera rotational shooting (90° or 180°) is set; (b) moving the symbol to set a position so as to indicate a lower end of an image to shoot and shooting the image; and (c) judging a rotation state of the camera using a movement position of the symbol and rotating and storing the shot image so that a storage direction of the shot image may be a reference storage direction.

The setting of the movement position of the symbol may include setting and storing a position of the symbol by inputting up/down/left/right button with a shutter pressed, or include a button for setting a movement position of the symbol. The setting and storing the movement position of the symbol may include setting and storing a position of the symbol by changing the number of times the button is inputted, or setting and storing the position of the symbol by selecting a predetermined menu for setting a position of the symbol.

The reference storage direction may be a direction for storing a shot image without rotating the camera.

The present invention may store the rotated image and simultaneously delete the symbol.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 3:
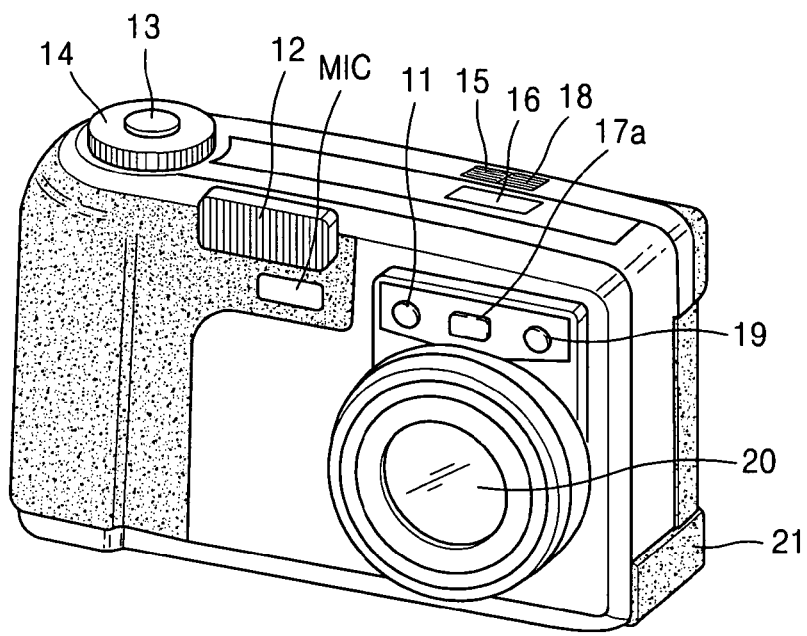
FIG. 3 is a perspective view illustrating a front appearance of a digital camera.

FIG. 3 is a perspective view illustrating a front appearance of an example digital camera.

Referring to FIG. 3, an example digital camera includes a microphone (MIC), a self-timer lamp 11, a flash 12, a shutter button 13, a mode dial 14, a function-selection button 15, a shooting information display unit 16, a viewfinder 17a, a function-block button 18, a flash-light amount sensor 19, a lens unit 20, and an external interface unit 21.

The self-timer lamp 11 operates for a set time from a time point at which the shutter button 13 is pressed to a time point at which the shutter operates during a self-timer mode.

The mode dial 14 is used in selecting and setting, by a user, a variety of modes such as a still image mode, a night scene mode, a moving image mode, a playback mode, a computer connection mode, and a system setting mode.

The function-selection button 15 is used in selecting, by a user, either of operation modes of a digital camera, such as a still image mode, a night scene mode, a moving image mode, and a playback mode.

The shooting information display unit 16 displays information of respective function related to shooting. The function-block button 18 is used in selecting, by a user, a respective function displayed on the shooting information display unit 16.

Figure 4:
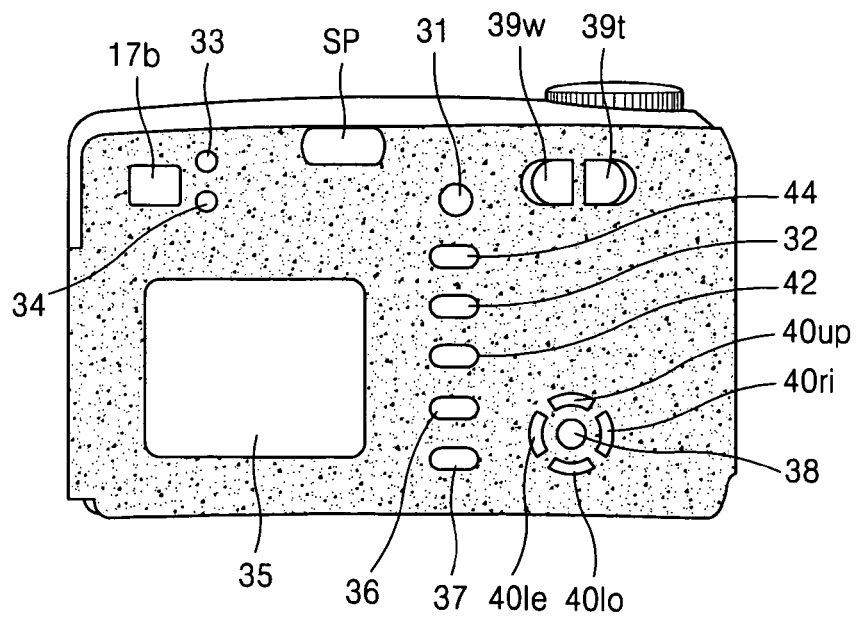
FIG. 4 is a backside view illustrating a rear appearance of the digital camera of FIG. 3.

FIG. 4 is a backside view illustrating a rear appearance of the digital camera of FIG. 3.

Referring to FIG. 4, the digital camera includes a speaker SP, a power button 31, a monitor button 32, an auto-focus lamp 33, a viewfinder 17b, a flash stand-by lamp 34, a display panel (e.g., a liquid crystal display (LCD)) 35, an exposure correction/deletion button 36, an enter/playback button 37, a menu/OK button 38, a wide angle-zoom button 39w, a tele-photo-zoom button 39t, an upward-movement button 40up, a right-movement button 40ri, a downward-movement button 40lo, a left-movement button 40le, a playback button 42, and a position setting button 44.

The monitor button 32 is used in controlling, by a user, an operation of the display panel 35. For example, if a user presses the monitor button 32 a first time an image of an object and shooting information thereof are displayed on the display panel 35, if a user presses the monitor button 32 a second time only the image of the object is displayed on the display panel 35 and if a user presses the monitor button 32 a third time the display panel 35 is turned off (e.g., for solely using the viewfinder 17b).

The auto-focus lamp 33 operates when an auto-focusing operation is completed.

Figure 1:
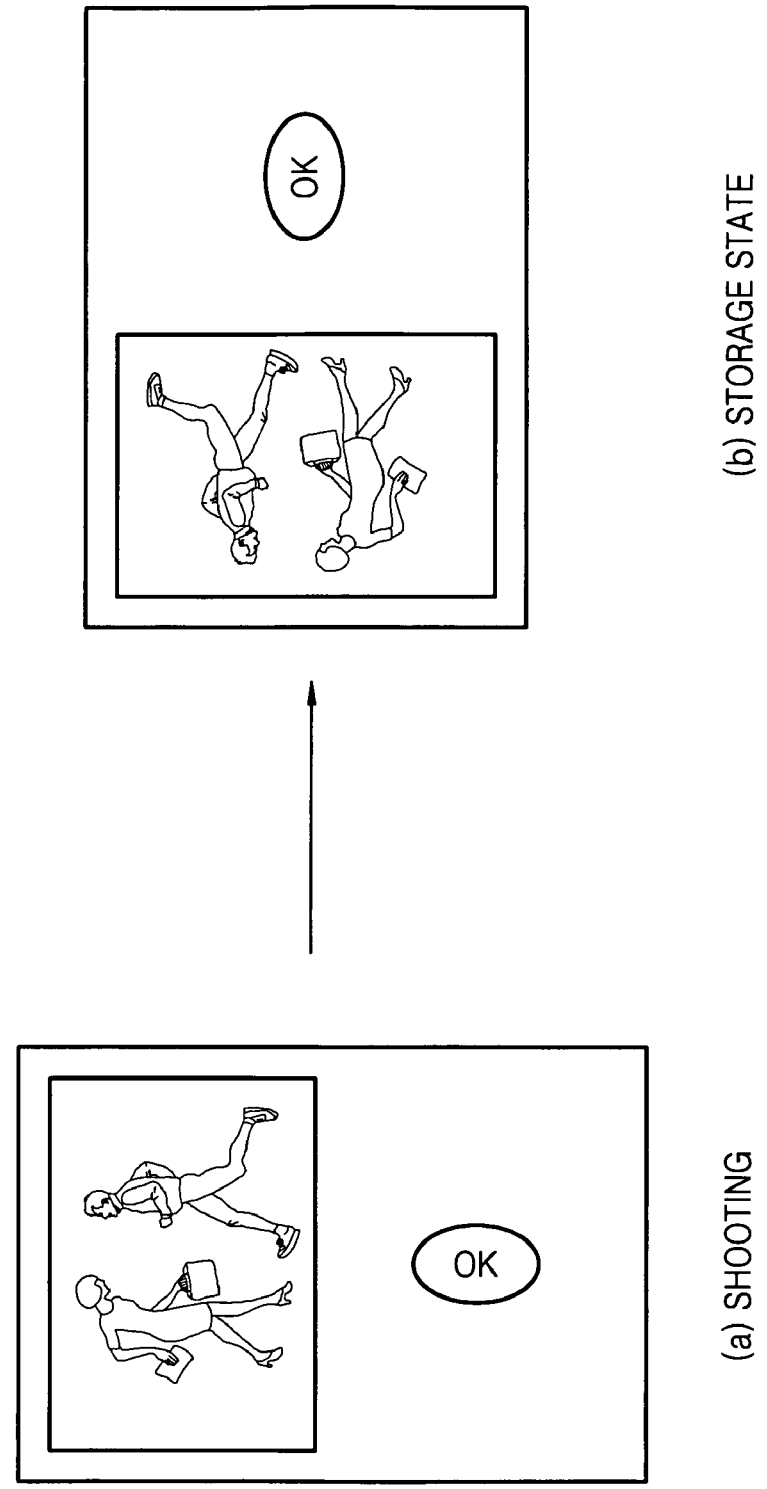
FIG. 1 is a view illustrating an image shooting screen and an image storage screen according to a related art.
Figure 2:
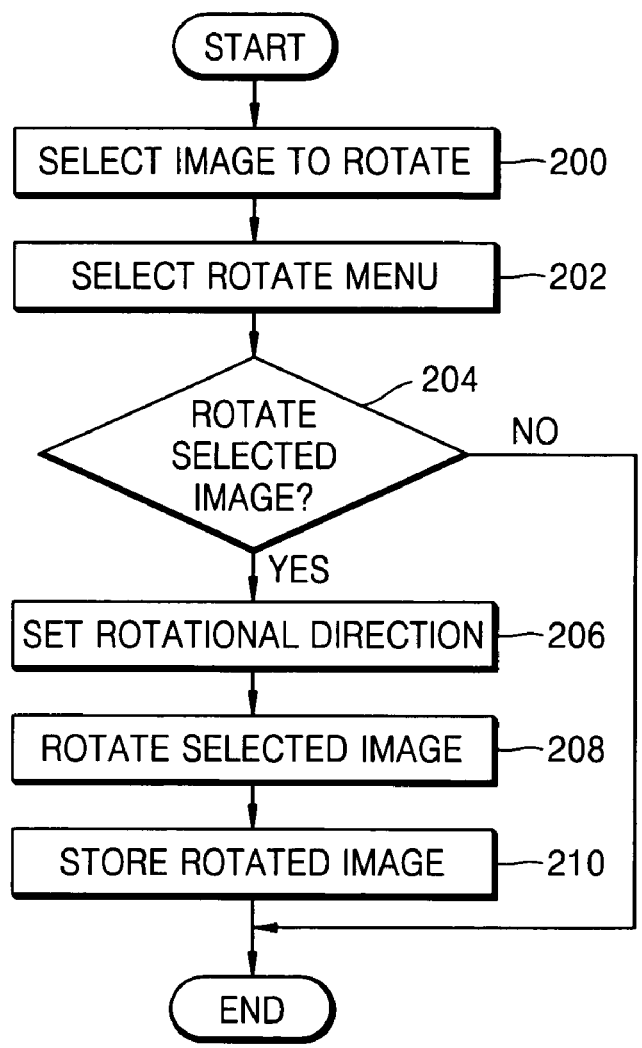
FIG. 2 is a flowchart of an operation of an image rotating method according to a related art.

The flash stand-by lamp 34 operates when the flash 12 (FIG. 2) is in a stand-by state (e.g., charging).

The exposure correction/deletion button 36 is used in adjusting, by a user, light amount in case of operating the digital camera manually, or used as a deletion button during an operation of setting a respective mode.

The enter/playback button 37 is used in receiving data from a user, or used for a stop or a playback functions upon a playback mode.

The menu/OK button 38 is used in displaying and selecting a menu of a mode selected from the mode dial 14.

The upward-movement button 40up, the right-movement button 40ri, the downward-movement button 40lo, and the left-movement button 40le are used in setting, by a user, a respective mode and also used in performing a position change within an image displayed on the display panel 35.

The playback mode button 42 is used in checking and manipulating a still image, a moving image, or voice information captured by the camera.

When the camera is set in a mode to shoot (i.e., capture) an image a predetermined symbol (e.g., on-screen-display (OSD) bar; referred to as an OSD bar hereinafter) is displayed on the display panel 35. The OSD bar is a kind of indication information for indicating an image reference (e.g. a lower end of an image) during shooting. For example, if the position setting button 44 is pressed a predetermined number of times a position of the OSD bar can be changed and set within the display panel 35. Description of the position setting button 44 will be made in detail below.

Figure 5:
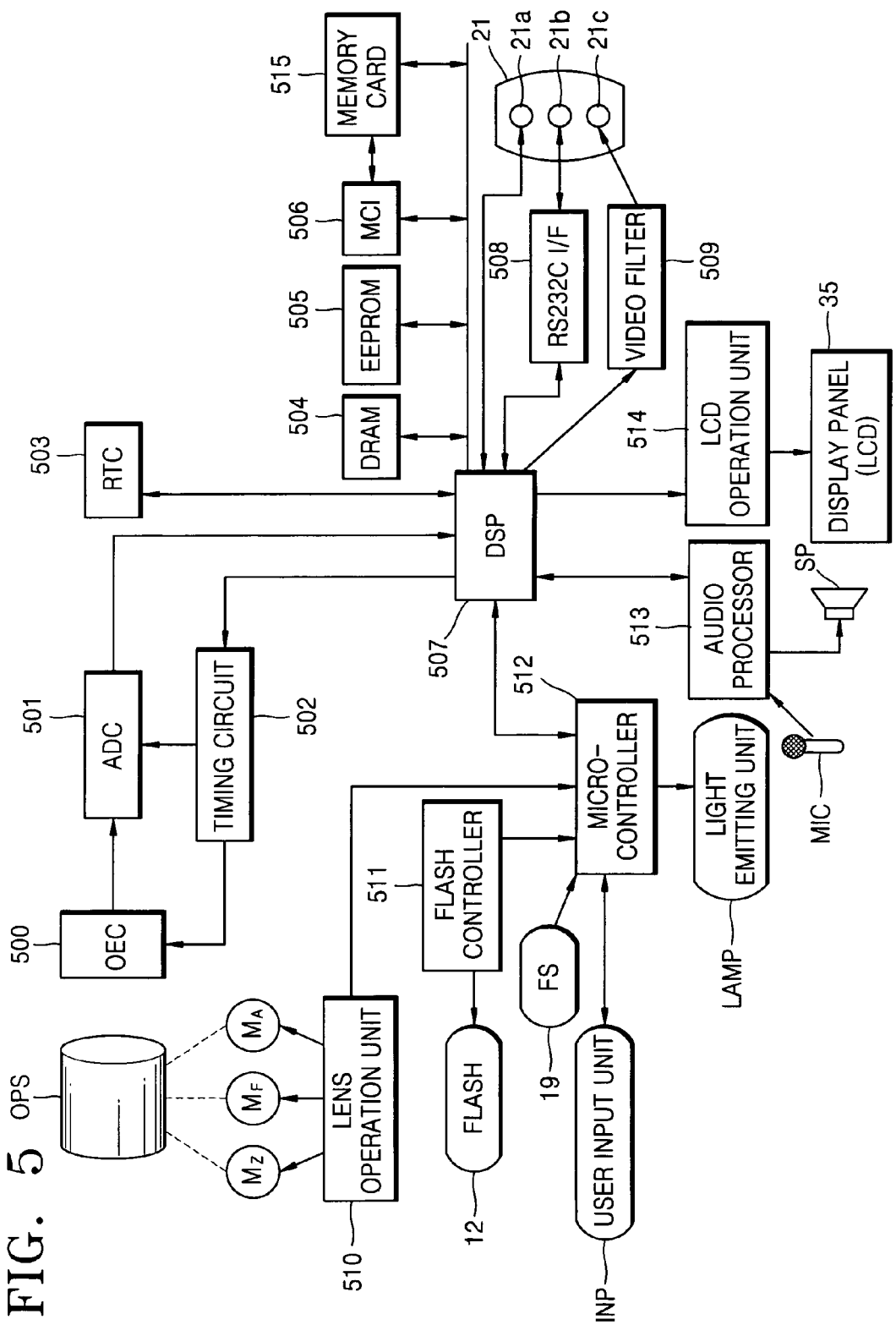
FIG. 5 is a block diagram illustrating an example construction of the digital camera illustrated in FIGS. 3 and 4.

FIG. 5 is a block diagram for an example construction of the digital camera illustrated in FIGS. 3 and 4, which includes a construction of an image rotating apparatus in accordance with the present invention.

An optical system (OPS) optically processes light from an object. As known in the art but not illustrated in the Figures, the lens unit 20 of the optical system includes a zoom lens (ZL), a focus lens (FL), and a compensation lens (CL) that are driven by one or more motors such as $M_Z$, $M_F$ shown in FIG. 5.

$M_A$ represents an aperture operating motor (not shown). Here, a rotational angle of the aperture operating motor $M_A$ is changed depending on whether a mode is a designated exposure mode or not. The designated exposure mode means a mode such that if part of a region desired by a user in a region to be shot coincides with a designated detection region displayed on the display panel 35 of the digital camera, exposure amount of the digital camera is set for an average brightness of the designated detection region.

An optical-electric converter (OEC) 500 of a charge coupled device (CCD) or a complementary metal-oxide-semiconductor (CMOS) converts light from the optical system (OPS) into an electric analog signal. Here, a digital signal processor (DSP) 507 controls operations of the OEC and an analog-digital converter (ADC) 501 by controlling a timing circuit 502. A correlation double sampler and analog-to-digital converter (CDS-ADC) element 501 as an analog-digital converter processes an analog signal from the OEC, removes its high frequency component noise, adjusts its amplitude, and converts the analog signal into a digital signal. The DSP 507 processes a digital signal from the CDS-ADC element 501 to generate a digital video signal classified into brightness and chrominance signals or components.

The lamp unit LAMP operated by the micro-controller 512 includes the self-timer lamp 11, the auto-focus lamp 33, and the flash stand-by lamp 34. The user input unit INP includes: the shutter button 13; the mode dial 14; the function-selection button 15; the function-block button 18; the monitor button 32; the exposure correction/deletion button 36; the enter/playback button 37; the menu/OK button 38; the wide angle-zoom button 39w; the telephoto-zoom button 39t; the upward-movement button 40up; the right-movement button 40ri; the downward-movement button 40lo; and the left-movement button 40le.

A digital video signal from the DSP 507 is temporarily stored in a dynamic random access memory (DRAM) 504. An algorithm and set data necessary for operation of the DSP 507 are stored in electrically erasable programmable read only memory (EEPROM) 505.

A user memory card 515 is attached/detached to and from a memory card interface (MCI) 506.

A digital video signal from the DSP 507 is inputted to an LCD operation unit 514 so that an image is displayed on the display panel 35.

In the meantime, a digital video signal from the DSP 507 can be transmitted through a serial communication using a universal serial bus (USB) connection unit 21a or RS232C interface 508 and a connection unit thereof and transmitted as a video signal through a video filter 509 and a video output unit 21c.

An audio processor 513 outputs a voice signal captured by a microphone (MIC) into the DSP 507 or a speaker (SP) and outputs an audio signal from the DSP 507 into the SP.

In the meantime, a flash 12 is operated by the micro-controller 512 and a flash controller 511 depending on a signal from a flash-light amount sensor (FS) 19.

Figure 6:
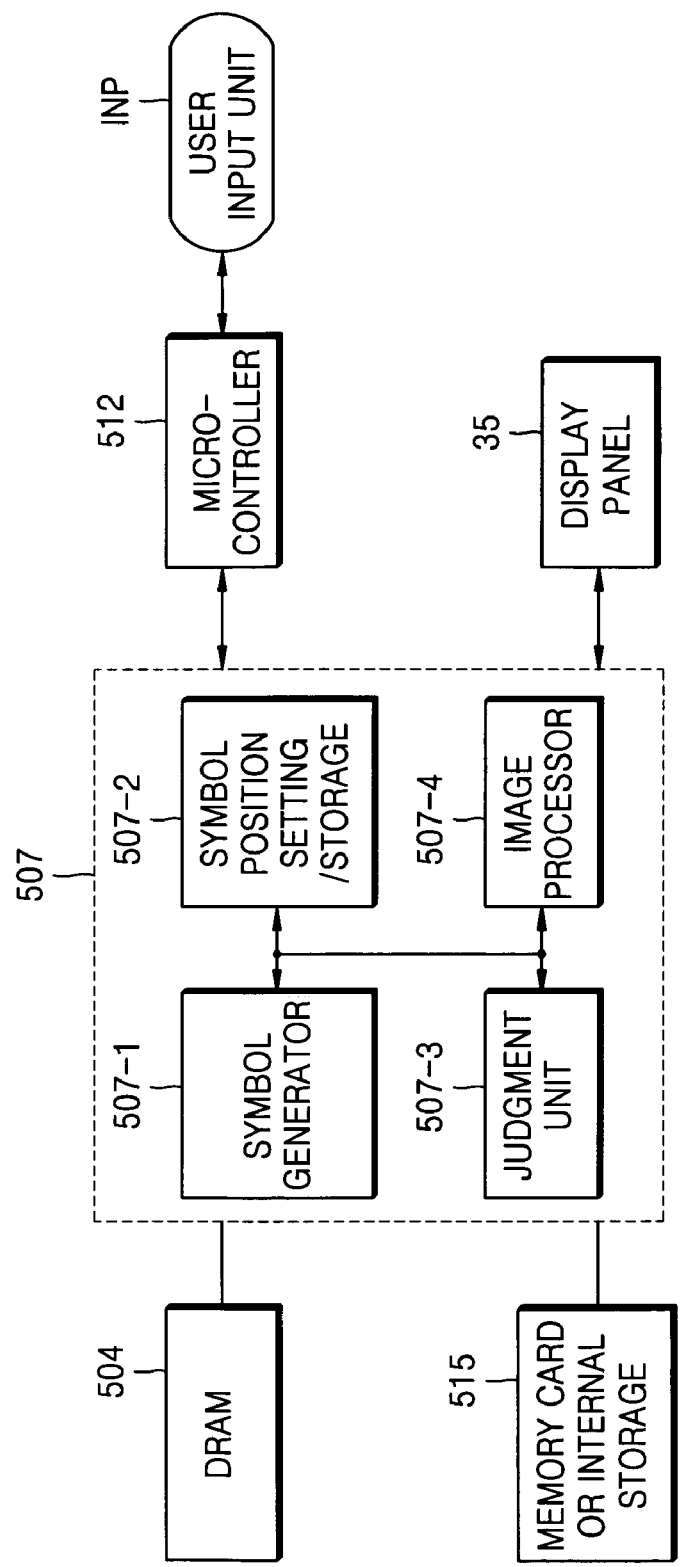
FIG. 6 is a block diagram of a construction of an image rotating apparatus according to the present invention.

FIG. 6 is a block diagram of a construction of an image rotating apparatus according to an embodiment of the present invention. The apparatus includes: a dynamic random access memory (DRAM) 504; a DSP 507 including a symbol generator 507-1, a symbol position setting/storage 507-2, a judgment unit 507-3, and an image processor 5074; a micro-controller 512; a memory card or an internal storage 515; a display panel 35; and a user input unit INP.

The micro-controller 512 provides various menus for operating a digital camera, and particularly, a menu for setting a rotational state of a camera in case of rotating the camera to be in a generally longitudinal (i.e., vertical) direction, for example by rotating the camera 90° clockwise or counter-clockwise, or rotating the camera to be upside down (i.e., rotating the camera 180°) to perform shooting.

If the menu is selected using the user input unit INP, the DSP 507 controls to rotate a shot image so that a storage direction of the image shot with the camera rotated may be a reference storage direction and controls the rotated image to be stored in the memory card or the internal storage 515 through the DRAM 504. Here, the reference storage direction is a direction for storing a shot image, thereby obviating the need to rotate the camera during reproduction (i.e., display).

The DSP 507 includes the symbol generator 507-1, the symbol position setting/storage 507-2, the judgment unit 507-3 and the image processor 507-4.

Figure 7:
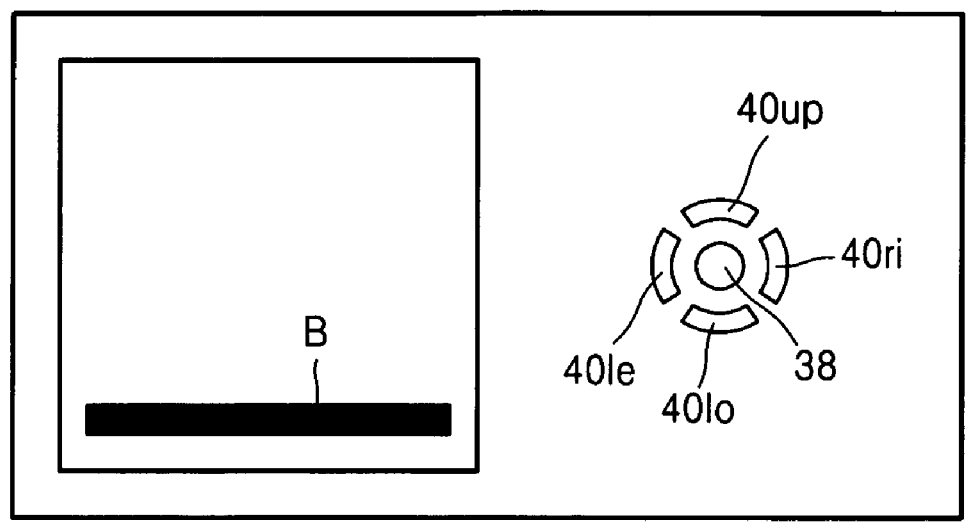
FIG. 7 is a view in which a symbol indicating a lower end of an image to shoot when a predetermined menu is selected to shoot an image by rotating a camera.

The symbol generator 507-1 generates a symbol for display on the display panel 35 (e.g., if a menu for setting a rotation state of a camera is selected). The symbol generated at the symbol generator 507-1 may be generated in various forms such as an alphanumeric character, icon or other indicium. For example, the symbol may be a bar. In the following description the symbol will be discussed as the OSD bar. FIG. 7 is a view exemplary illustrating the OSD bar B generated by the symbol generator 507-1 and displayed on the display panel 35. When performing rotational shooting using a camera, the OSD bar B indicates a reference direction for the captured image (e.g., a lower end of the image). An image storage direction using the OSD bar B illustrated in FIG. 7 for its lower end becomes a reference storage direction.

The symbol position setting/storage 507-2 stores the reference storage direction and sets and stores a movement position of the OSD bar B so as to indicate a lower end of an image to shoot.

There may exist lots of methods for setting a movement position of the OSD bar B. The present invention will be described using three embodiments.

Figure 8:
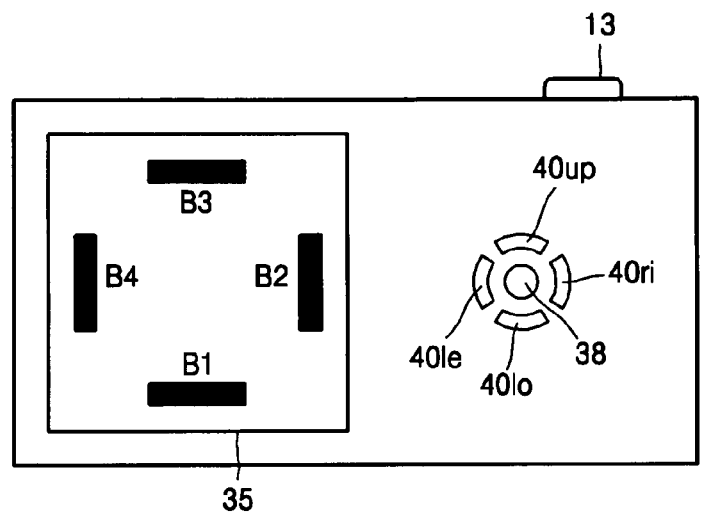
FIG. 8 is a view illustrating a first embodiment of setting a symbol's position of an image to shoot.

A first method for setting a movement position of the OSD bar B is to set and store a movement position of the OSD bar B by pressing an upward-movement button 40up, a right-movement button 40ri, a downward-movement button 40lo, a left-movement button 40le, and a menu/OK button 38 with the shutter button 13 pressed as illustrated in FIG. 8.

If a downward-movement button 40lo is pressed while the shutter button 13 is pressed a position of the OSD bar B is moved to a lower end B1 of the display panel 35. If a menu/OK button 38 is pressed under that state, the position of the OSD bar B is set to B1 and stored. If a right-movement button 40ri is pressed while the shutter button 13 pressed a position of the OSD bar B is moved to a right end B2 of the display panel 35. If a menu/OK button 38 is pressed under that state, the position of the OSD bar B is set to B2 and stored.

If an upward-movement button 40up is pressed while the shutter button 13 pressed a position of the OSD bar B is moved to an upper end B3 of the display panel 35. If a menu/OK button 38 is pressed under that state, the position of the OSD bar B is set to B3 and stored. If a left-movement button 40le is pressed while the shutter button 13 pressed a position of the OSD bar B is moved to a left end B4 of the display panel 35. If a menu/OK button 38 is pressed under that state, the position of the OSD bar B is set to B4 and stored.

Figure 9:
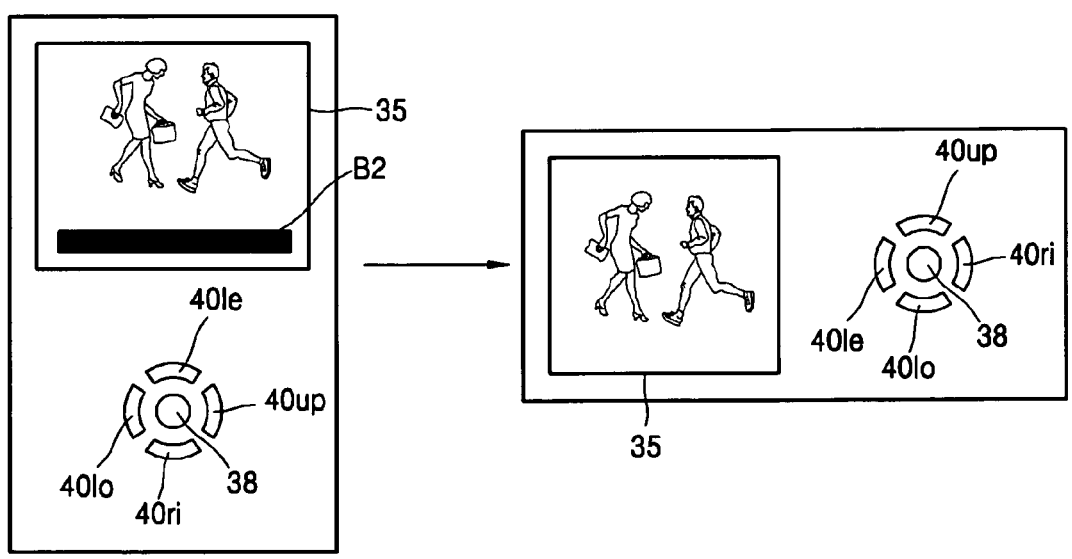
FIG. 9 is a view illustrating an image shooting screen and an image storage screen after the symbol position is set using FIG. 8.

FIG. 9 is a view illustrating an image shooting screen and an image storage screen after the OSD bar B position is set using the first method. If the position of the OSD bar B is set to a right end B2 of the display panel 35 as illustrated in FIG. 9A and a camera is rotated clockwise 90° to shoot an image after a menu for setting a rotational state of the camera is selected, the shot image is rotated and stored so that its storage direction may be the reference storage direction as illustrated in FIG. 9B.

Figure 10:
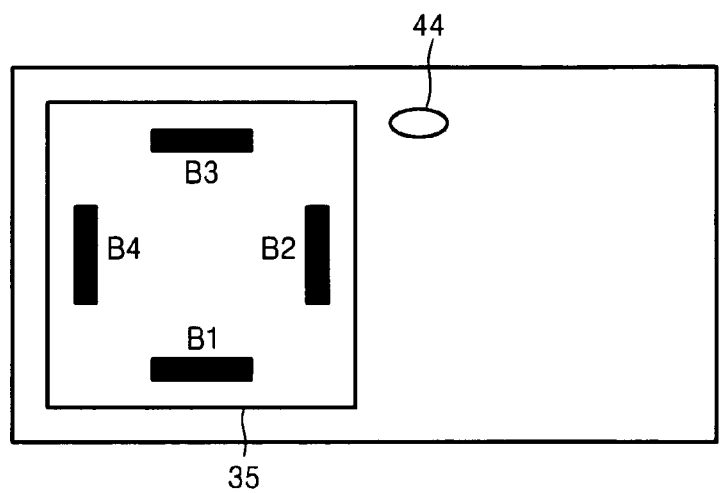
FIG. 10 is a view illustrating a second embodiment of setting a symbol's position of an image to shoot.

The second method for setting a movement position of the OSD bar B is to set and store the position of the OSD bar B within the display panel 35 by changing the number of times a position setting button 44 separately provided is pressed as illustrated in FIG. 10.

For example, if the position setting button 44 is pressed once, a position of the OSD bar B is set to a lower end B1 of the display panel 35 and stored. If the position setting button 44 is pressed twice, a position of the OSD bar B is set to a right end B2 of the display panel 35 and stored. If the position setting button 44 is pressed three times, a position of the OSD bar B is set to an upper end B3 of the display panel 35 and stored. If the position setting button 44 is pressed four times, a position of the OSD bar B is set to a left end B4 of the display panel and stored.

Figure 11:
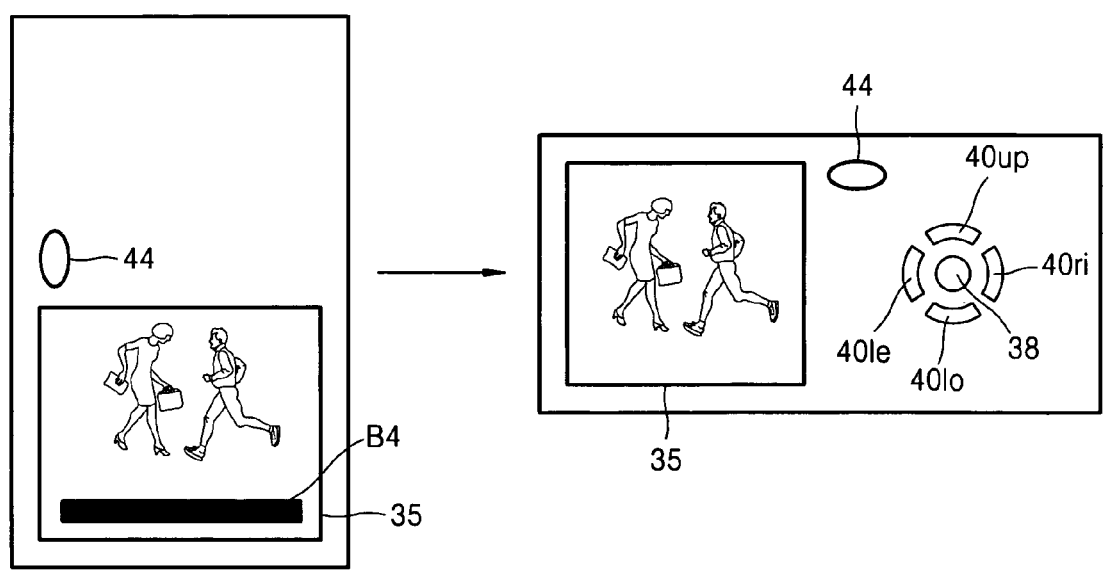
FIG. 11 is a view illustrating an image shooting screen and an image storage screen after the symbol position is set using FIG. 10.

FIG. 11 is a view illustrating an image shooting screen and an image storage screen after the position of the OSD bar B is set using the second method when the camera is rotated 90° counterclockwise. If the position setting button 44 is pressed four times to set the position of the OSD bar B to a left end B4 of the display panel 35 after a menu for selecting a rotational state of a camera is selected as illustrated in FIG. 11A, a shot image is rotated and stored so that its storage direction may be a reference storage direction as illustrated in FIG. 11B.

Figure 12:
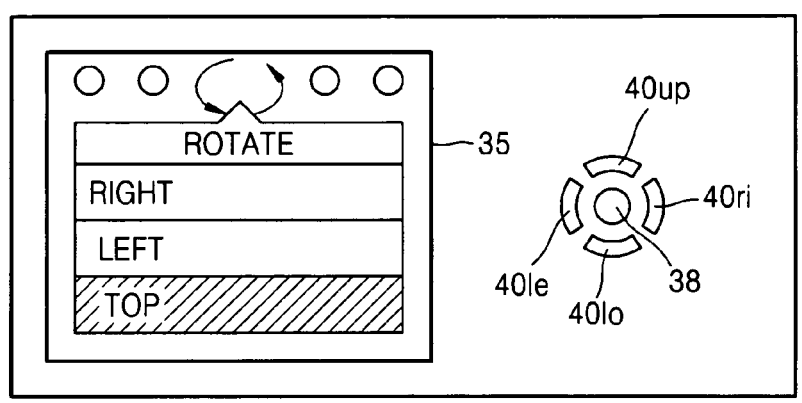
FIG. 12 is a view illustrating a third embodiment of setting a symbol's position of an image to shoot.

The third method for setting a movement position of the OSD bar B is to set and store the position of the OSD bar B by selecting an item of a displayed menu (e.g., menu "Rotate" as shown) for setting a position of the OSD bar B as illustrated in FIG. 12.

If a "RIGHT" item is selected from the menu display, a position of the OSD bar B is set to a right end (B2 of FIGS. 8 and 10) of the display panel 35 and stored. If a "LEFT" item is selected from the menu display, a position of the OSD bar B is set to a left end (B4 of FIGS. 8 and 10) of the display panel 35 and stored. If a "TOP" item is selected from the menu display, a position of the OSD bar B is set to an upper end (B3 of FIGS. 8 and 10) of the display panel 35 and stored. If a selection is not made from the menu display a position of the OSD bar B is set to a default (e.g., bottom) position that corresponds to a reference storage direction (B1 of FIGS. 8 and 10) and stored as a default value.

Figure 13:
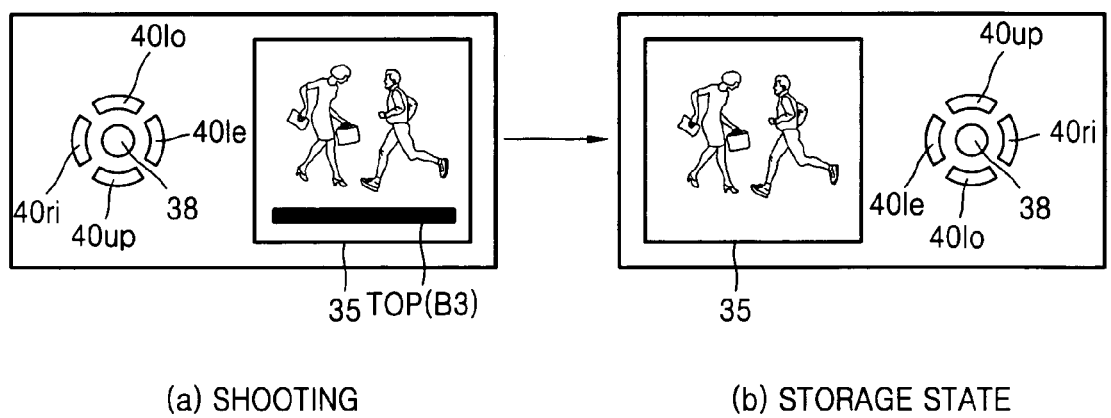
FIG. 13 is a view illustrating an image shooting screen and an image storage screen after the symbol position is set using FIG. 12.

FIG. 13 is a view illustrating an image shooting screen and an image storage screen after the position of the OSD bar B is set using the third method where the camera is rotated 180°. If a "TOP" item is selected from the menu display as illustrated in FIG. 12 after the menu for setting a rotational state of a camera is selected, a position of the OSD bar B is set to an upper end (B3 of FIGS. 8 and 10) of the display panel 35 as illustrated in FIG. 13A. If an image is shot with a camera rotated (180°) under that state, the shot image data is changed (e.g., rotated) and stored so that its storage direction may be a reference storage direction as illustrated in FIG. 13B.

If an image shooting is completed after a position of the OSD bar B is set at the symbol position setting/storage 507-2, the judgment unit 507-3 judges a rotation of a camera by comparing a storage direction of the shot image and the reference storage direction using a position movement of the OSD bar B.

Referring to FIG. 9, the judgment unit 507-3 compares a position B2 of the OSD bar B of the shot image with a position B1 of the OSD bar B that corresponds to the reference storage direction as illustrated in FIG. 9A. Comparison of those positions of the OSD bar shows that the image has been shot with the camera rotated 90° clockwise.

Referring to FIG. 11, the judgment unit 507-3 compares a position B4 of the OSD bar B of the shot image with a position B1 of the OSD bar B that corresponds to the reference storage direction as illustrated in FIG. 11A. Comparison of those positions of the OSD bar shows that the image has been shot with the camera rotated 90° counterclockwise.

Referring to FIG. 13, the judgment unit 507-3 compares a position B3 of the OSD bar B of the shot image with a position B1 of the OSD bar B that corresponds to the reference storage direction as illustrated in FIG. 13A. Comparison of those positions of the OSD bar shows that the image has been shot with the camera rotated 180°.

The image processor 507-4 modifies captured image data to rotate a shot image using a judgment result of the judgment unit 507-3 and controls the rotated image to be stored in the memory card or the internal storage 515 through the DRAM 504. If an image is shot with a camera rotated 90° clockwise as illustrated in FIG. 9, the image processor 507-4 rotates the shot image 90° counterclockwise and stores the same. If an image is shot with a camera rotated 90° counterclockwise as illustrated in FIG. 11, the image processor 507-4 rotates the shot image 90° clockwise and stores the same. If an image is shot with a camera rotated 180° as illustrated in FIG. 13, the image processor 507-4 rotates the shot image 180° and stores the same. The image processor 507-4 deletes the OSD bar B when storing the rotated image.

Figure 14:
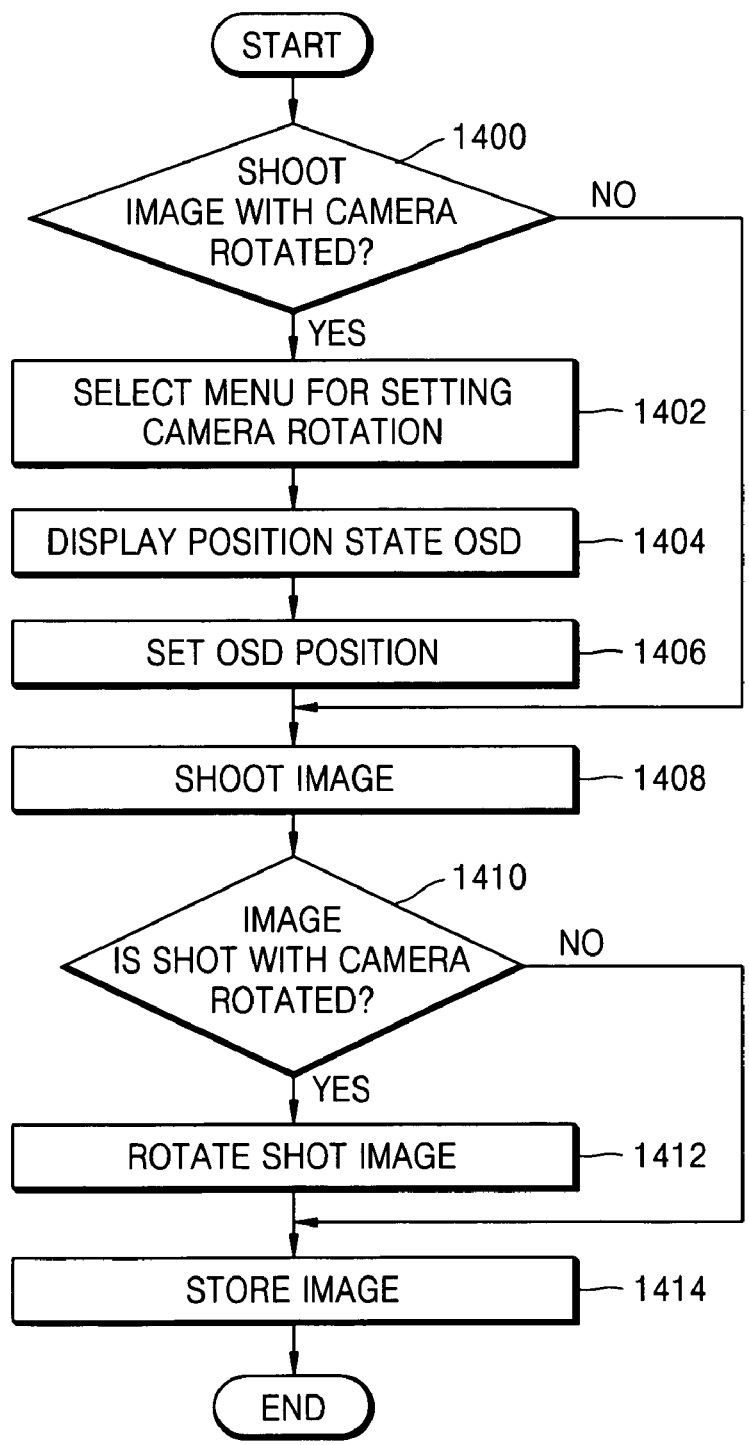
FIG. 14 is a flowchart illustrating an operation of an image rotating method according to the present invention.

FIG. 14 is a flowchart illustrating an operation of an image rotating method according to the present invention.

When a user intends to take a photograph with a camera rotated in a longitudinal direction (camera rotation 90°) or rotated upside down (camera rotation 180°) (operation 1400), a user selects a menu for setting a rotational state of a camera provided by the micro-controller 512 (operation 1402).

If the menu for setting a rotation state of a camera is selected, the DSP 507 generates and displays the OSD bar B on the display panel 35 as illustrated in FIG. 7 (operation 1404). The OSD bar B indicates a lower end of an image to shoot when taking a photograph with a camera rotated. The image storage direction using the OSD bar B illustrated in FIG. 7 for a lower end is the reference storage direction.

A user checks the OSD bar B displayed on the display panel 35 and sets a movement position (operation 1406).

There may exist lots of methods for setting a movement position of the OSD bar B. The present invention will be described using three embodiments.

Figure 15:
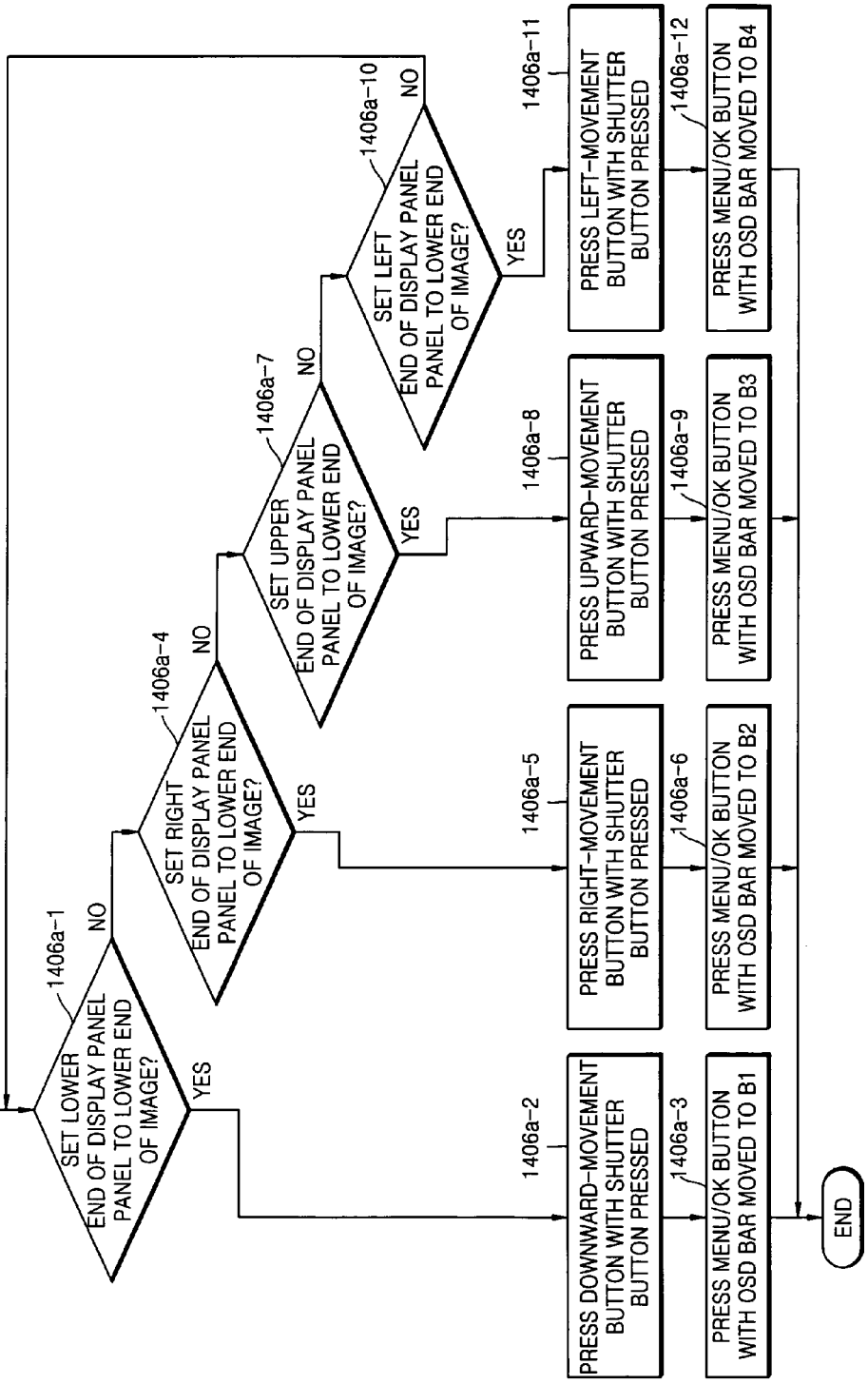
FIG. 15 is a view illustrating a first embodiment of a method for setting a symbol position of an image to shoot in FIG. 14.

Referring to FIG. 15, a first method for setting a movement position of the OSD bar B is to set and store a movement position of the OSD bar B by pressing an upward-movement button 40*up*, a right-movement button 40*ri*, a downward-movement button 40*lo*, a left-movement button 40*le*, and a menu/OK button 38 with the shutter button 13 pressed. The first method will be explained with reference also to FIG. 8.

If a user intends to set a lower end B1 of the display panel 35 to be a lower end of an image to shoot (operation 1406A-1), a user presses a downward-movement button 40*ol* with the shutter button 13 pressed (operation 1406A-2). Then, a position of the OSD bar B is moved to the lower end B1 of the display panel 35. If the menu/OK button 38 is pressed under that state, the position of the OSD bar B is set to B1 and stored (operation 1406A-3).

If a user intends to set a right end B2 of the display panel 35 to be a lower end of an image to shoot (operation 1406A4), a user presses a right-movement button 40*ri* with the shutter button 13 pressed (operation 1406A-5). Then, a position of the OSD bar B is moved to the right end B2 of the display panel 35. If the menu/OK button 38 is pressed under that state, the position of the OSD bar B is set to B2 and stored (operation 1406A-6).

If a user intends to set an upper end B3 of the display panel 35 to be a lower end of an image to shoot (operation 1406A-7), a user presses an upward-movement button 40*up* with the shutter button 13 pressed (operation 1406A-8). Then, a position of the OSD bar B is moved to the upper end B3 of the display panel 35. If the menu/OK button 38 is pressed under that state, the position of the OSD bar B is set to B3 and stored (operation 1406A-9).

If a user intends to set a left end B4 of the display panel 35 to be a lower end of an image to shoot (operation 1406A-10), a user presses a left-movement button 401*e* with the shutter button 13 pressed (operation 1406A-11). Then, a position of the OSD bar B is moved to the lower end B4 of the display panel 35. If the menu/OK button 38 is pressed under that state, the position of the OSD bar B is set to B4 and stored (operation 1406A-12).

Figure 16:
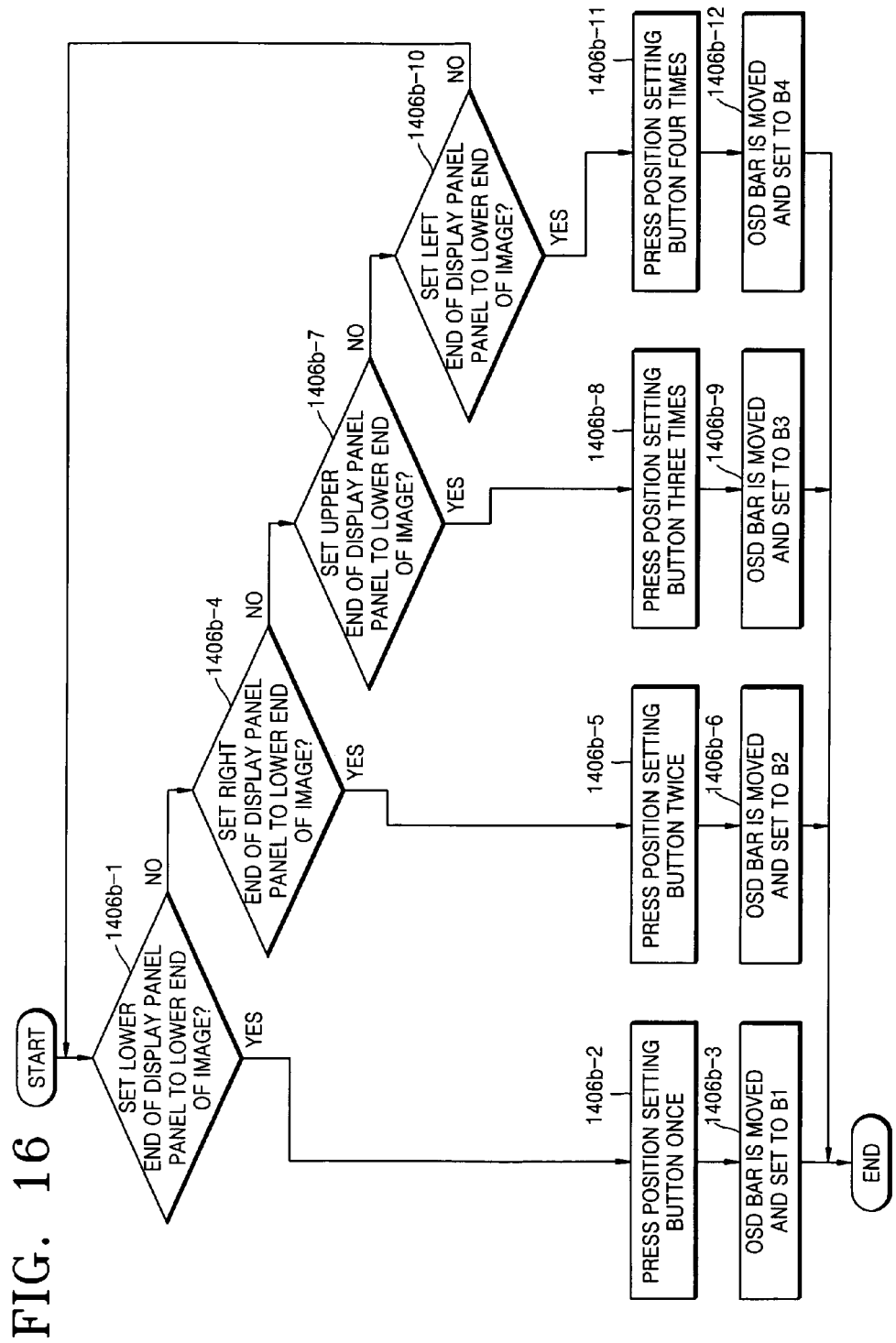
FIG. 16 is a view illustrating a second embodiment of a method for setting a symbol position of an image to shoot in FIG. 14.

Referring now to FIG. 16, the second method for setting a movement position of the OSD bar B is to set and store the position of the OSD bar B within the display panel 35 by changing the number of times a position setting button 44 is pressed. The second method will be explained with reference to FIG. 10.

If a user intends to set a lower end B1 of the display panel 35 to be a lower end of an image to shoot (operation 1406B-1), a user presses the position setting button 44 once (operation 1406B-2). Then, a position of the OSD bar B is moved to a lower end B1 of the display panel 35 and set and stored (operation 1406B-3).

If a user intends to set a right end B2 of the display panel 35 to be a lower end of an image to shoot (operation 1406B-4), a user presses the position setting button 44 twice (operation 1406B-5). Then, a position of the OSD bar B is moved to a right end B2 of the display panel 35 and set and stored (operation 1406B-6).

If a user intends to set an upper end B3 of the display panel 35 to be a lower end of an image to shoot (operation 1406B-7), a user presses the position setting button 44 three times (operation 1406B-8). Then, a position of the OSD bar B is moved to the upper end B3 of the display panel 35 and set and stored (operation 1406B-9).

If a user intends to set a left end B4 of the display panel 35 to be a lower end of an image to shoot (operation 1406B-10), a user presses the position setting button 44 four times (operation 1406B-11). Then, a position of the OSD bar B is moved to the left end B4 of the display panel 35 and set and stored (operation 1406B-12).

Figure 17:
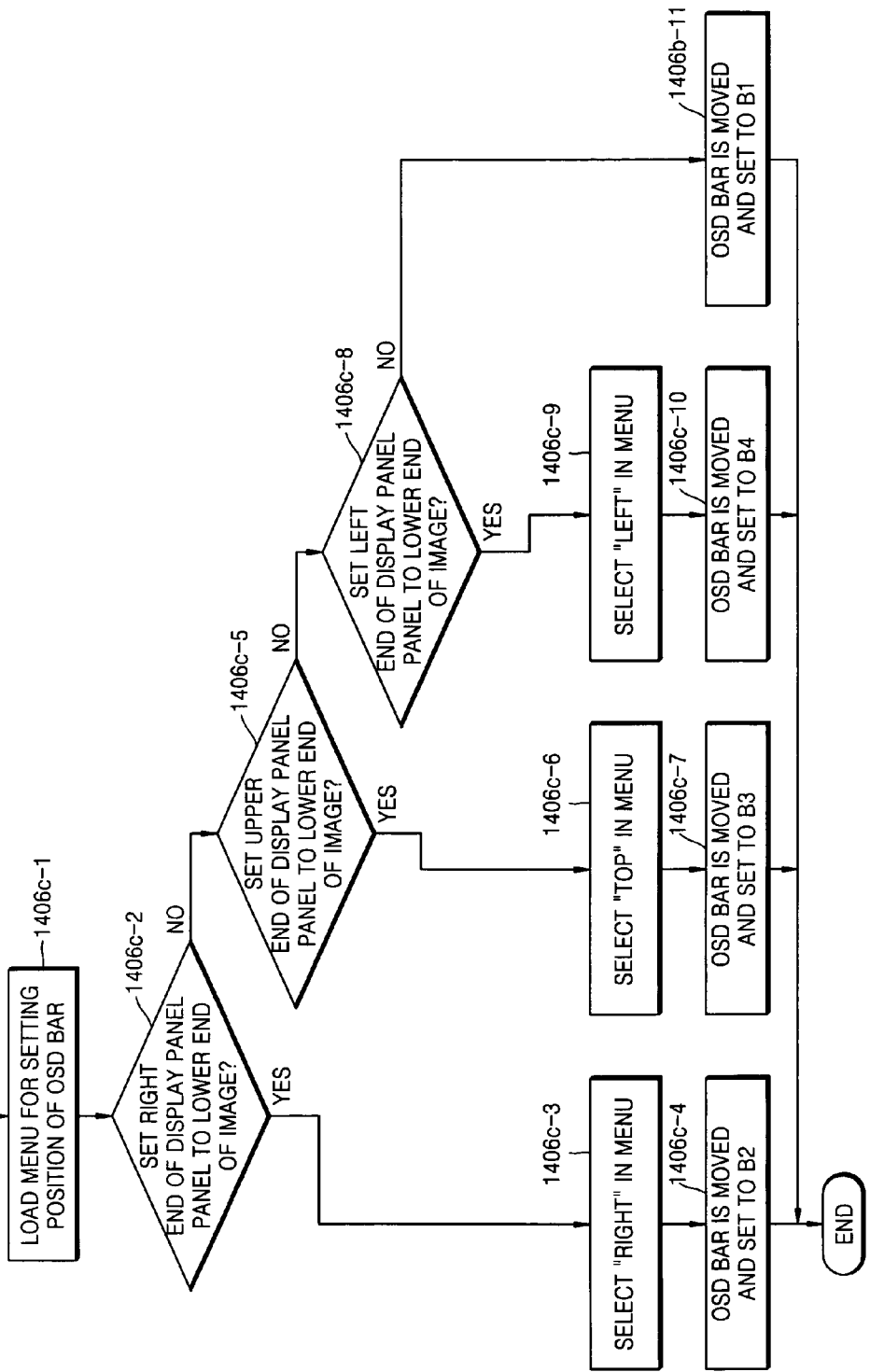
FIG. 17 is a view illustrating a third embodiment of a method for setting a symbol position of an image to shoot in FIG. 14.

Referring now to FIG. 17, the third method for setting a movement position of the OSD bar B is to set and store the position of the OSD bar B by selecting a menu (Rotate) for setting a position of the OSD bar B. The third method will be explained with reference also to FIG. 12.

A user opens the menu (e.g., the Rotate menu illustrated in FIG. 12) to set a position of the OSD bar B (operation 1406C-1).

If a user intends to set a right end B2 of the display panel 35 to be a lower end of an image to shoot (operation 1406C-2), a user selects a "RIGHT" item in the menu display (operation 1406C-3). Then, a position of the OSD bar B is moved to the right end B2 of the display panel 35 and set and stored (operation 1406C-4).

If a user intends to set an upper end B3 of the display panel 35 to be a lower end of an image to shoot (operation 1406C-5), a user selects a "TOP" item in the menu display (operation 1406C-6). Then, a position of the OSD bar B is moved to the upper end B3 of the display panel 35 and set and stored (operation 1406C-7).

If a user intends to set a left end B4 of the display panel 35 to be a lower end of an image to shoot (operation 1406C-8), a user selects a "LEFT" item in the menu display (operation 1406C-9). Then, a position of the OSD bar B is moved to the left end B4 of the display panel 35 and set and stored (operation 1406C-10).

If a selection is not made from the menu display for setting the position of the OSD bar B, a position of the OSD bar B is set to a default position that corresponds to a reference storage direction (e.g., B1) and stored as a default value.

If the setting of the position of the OSD bar B is completed, a user shoots an image (operation 1408).

After an image is shot, the DSP 507 judges whether the image has been shot with the camera rotated (operation 1410). The DSP 507 judges a camera rotation by comparing a storage direction of the shot image with the reference storage direction using a position movement of the OSD bar B. Referring to FIG. 9 it is judged that the image has been shot with the camera rotated 90° clockwise, referring to FIG. 11 it is judged that the image has been shot with the camera rotated 90° counterclockwise and referring to FIG. 13 it is judged that the image has been shot with the camera rotated 180°.

The DSP rotates the shot image accordingly relative to the judgment result (operation 1412). When the image is shot with the camera rotated 90° clockwise as illustrated in FIG. 9, the DSP 507 rotates the shot image 90° counterclockwise. When the image is shot with the camera rotated 90° counterclockwise as illustrated in FIG. 11, the DSP 507 rotates the shot image 90° clockwise. When the image is shot with the camera rotated 180° as illustrated in FIG. 13, the DSP 507 rotates the shot image 180°.

If the rotation of the image is completed, the DSP 507 stores the rotated image to the memory card or the internal storage 515 through the DRAM 504 (operation 1414). Further, the DSP 507 cooperates with the micro-controller 512 to delete the OSD bar B when storing the rotated image.

As described above, the present invention rotates and stores a shot image so that a storage direction of the image shot with the camera rotated may be a reference storage direction, which provides convenience that a user needs not to rotate the camera to check the shot image when playing the captured image.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, while the embodiments provide a means to rotate a captured image by 90° or 180°, other embodiments may provide a means to rotate a captured image by other predetermined or user-selectable angles to obviate the need to physically rotate the camera or tilt one's head to properly view the reproduced image.

What is claimed is:

1. An image rotating apparatus that receives a captured image from an optical system for storage in a memory, the apparatus comprising:
    a symbol generator that provides a reference symbol on a display panel, the reference symbol being movable according to a user input;
    a judgment unit in communication with the symbol generator, wherein the judgment unit determines a rotation angle and a rotation direction of the optical system based on the user input;
    a position setting unit in communication with the symbol generator for storing a location of the reference symbol; and
    an image processor in communication with the judgment unit, wherein the image processor changes data of the captured image according to the rotation angle and the rotation direction to rotate the captured image, and stores the data to the memory,
    wherein the position setting unit is in further communication with the judgment unit for outputting the location, the judgment unit comparing the location with a default reference location.

2. The image rotating apparatus of claim 1 wherein the default reference location is a bottom of the display panel.

3. The image rotating apparatus of claim 1 wherein the user input comprises a position setting actuator.

4. The image rotating apparatus of claim 3 wherein the position setting actuator is selected from the group consisting of a right-movement button, a left-movement button, an upward-movement button and a downward-movement button.

5. The image rotating apparatus of claim 3 wherein the position setting actuator comprises a position setting button that generates one or more user input signals for moving the reference symbol based on a number of times that the position setting button is pressed.

6. A digital camera that saves a plurality of captured images in a like orientation regardless of a camera orientation, the digital camera comprising:
   a display that reproduces an image to be captured;
   a user input including a reference location means and a shutter button;
   a memory that stores the plurality of images; and
   a processor linked with the display, the user input and the memory, the processor comprising:
      a symbol generating means for displaying a reference symbol on the display, the reference symbol being movable on the display according to a signal from the reference location means;
      a judgment means in communication with the symbol generating means for determining the camera orientation relative to a location of the reference symbol; and
      an image processing means in communication with the judgment means for changing a data of a captured image according to the location of the reference symbol to rotate the captured image and storing the data to the memory.

7. The digital camera of claim 6 wherein the processor further comprises a position setting means in communication with the symbol generating means for storing the location of the reference symbol.

8. The digital camera of claim 7 wherein the position setting means is in farther communication with the judgment means for outputting the location, the judgment means comparing the location with a default reference location.

9. The digital camera of claim 8 wherein the default reference location is a bottom of the display.

10. The digital camera of claim 6 wherein the processor comprises at least one of a digital signal processor and a microcontroller.

11. The digital camera of claim 6 wherein the reference location means comprises a position setting actuator.

12. The digital camera of claim 11 wherein the position setting actuator is selected from the group consisting of a right-movement button, a left-movement button, an upward-movement button and a downward-movement button.

13. The digital camera of claim 11 wherein the position setting actuator comprises a position setting button that generates one or more user input signals for moving the reference symbol based on a number of times that the position setting button is pressed.

14. A method for rotating an image in a digital camera, the method comprising:
   displaying a reference symbol on a display of the digital camera;
   selecting a position on the display for the reference symbol relative to a user input, the selecting step comprising:
      detecting a first signal from a shutter actuator;
      detecting, substantially simultaneously with the first signal, a second signal from a position setting actuator;
      moving the position of the reference symbol on the display; and
      setting the position;
   capturing an image reproduced on the display with the reference symbol;
   judging a rotation state of the image relative to the position of the reference symbol;
   changing an image data to rotate the image; and
   saving the image data resulting from the changing step.

15. The image rotating method of claim 14 wherein the setting step comprises:
   detecting a third signal from a confirmation actuator; and
   storing the position of the reference symbol to a memory.

16. The image rotating method of claim 15 wherein the judging step comprises:
   determining a default position for the reference symbol;
   recalling the position from the memory; and
   comparing the position with the default position to determine a rotation angle and rotation direction.

17. The image rotating method of claim 16 wherein the changing step comprises rearranging the image data to counteract the rotation angle and rotation direction.

* * * * *